March 13, 1934.  H. R. GRAYBILL  1,950,726
DIE PRESS
Filed Sept. 18, 1931   8 Sheets-Sheet 2

INVENTOR
HERSHEY ROY GRAYBILL
BY
*Marks & Clark*
ATTORNEYS

March 13, 1934.  H. R. GRAYBILL  1,950,726
DIE PRESS
Filed Sept. 18, 1931  8 Sheets-Sheet 4

INVENTOR
HERSHEY ROY GRAYBILL
BY
Marks & Clerk
ATTORNEYS

March 13, 1934.  H. R. GRAYBILL  1,950,726
DIE PRESS
Filed Sept. 18, 1931  8 Sheets-Sheet 5

INVENTOR
HERSHEY ROY GRAYBILL
BY
Marks & Clerk
ATTORNEYS

March 13, 1934. H R. GRAYBILL 1,950,726
DIE PRESS
Filed Sept. 18, 1931 8 Sheets-Sheet 6

INVENTOR
HERSHEY ROY GRAYBILL
BY Marks & Clerk
ATTORNEYS

March 13, 1934.  H. R. GRAYBILL  1,950,726
DIE PRESS
Filed Sept. 18, 1931  8 Sheets-Sheet 7

INVENTOR
HERSHEY ROY GRAYBILL
BY HIS ATTORNEYS
Marks & Clerk

March 13, 1934.   H. R. GRAYBILL   1,950,726
DIE PRESS
Filed Sept. 18, 1931   8 Sheets-Sheet 8

INVENTOR
HERSHEY ROY GRAYBILL
BY *Marks & Clerk*
ATTORNEYS

Patented Mar. 13, 1934

1,950,726

UNITED STATES PATENT OFFICE 1,950,726

DIE PRESS

Hershey Roy Graybill, Lititz, Pa., assignor to Animal Trap Company of America, Lititz, Pa., a corporation of Pennsylvania Application September 18, 1931, Serial No. 563,517

16 Claims. (Cl. 153—34)

This invention relates to die presses and particularly to die presses employed in the manufacture of sheet metal articles such as garden implements, the completed form of which is such as to necessitate operating upon the sheet metal blank with more than a single pair of dies.

Such sheet metal tools, implements and the like have hitherto been formed in power presses equipped with suitable dies, each of the several steps in the formation of a tool being accomplished by a separate and distinct operation either in several machines each provided with suitable different dies, or in one machine in which the dies are changed after each operation.

The main object of the present invention is to provide for use in combination with a die press a set of dies constructed and arranged to produce in a single cycle of operation of the press a complete sheet metal tool, implement or article, as for example a garden implement having a tubular handle portion formed integral with the tool portion, the finished form of which is such that it cannot be obtained with a single pair of dies.

A further object of the invention is to provide in conjunction with the set of dies means for automatically ejecting the finished article, thereby avoiding the delay of removing the blank by hand and the danger of the machine being jammed or broken by the insertion of a further blank while a finished article is still in place.

Another object of the invention is to provide means in conjunction with the die set to raise the finished article into position for easy removal.

The invention further comprises certain novel arrangements and combinations of parts which will be hereinafter described and more particularly pointed out in the appended claims.

In the accompanying drawings:—

Fig. 7 is a front elevation of the three dies as shown in Fig. 3;

Figure 1:
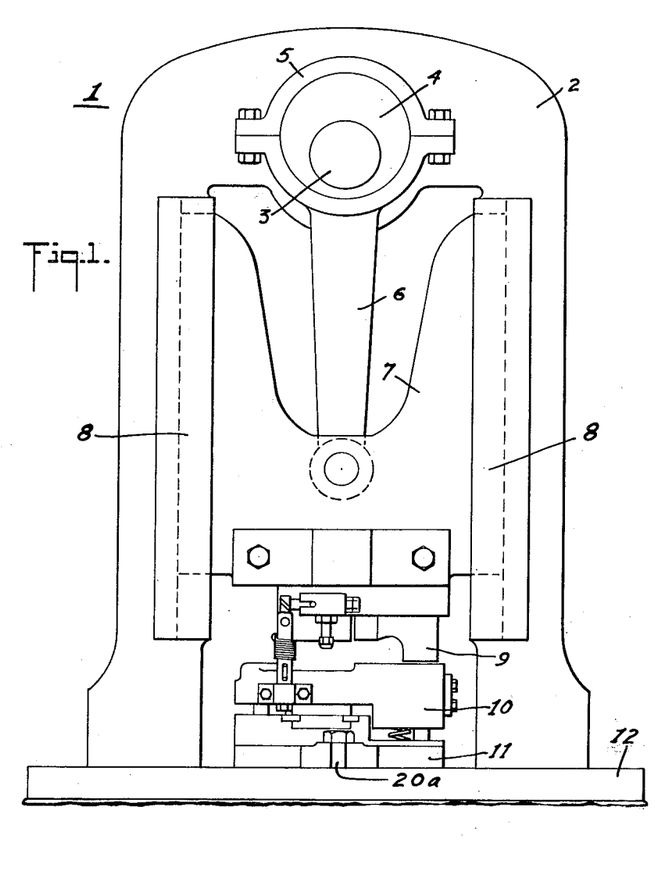
Figure 1 is a front elevation of one form of a machine according to the invention with dies attached.
Figure 2:
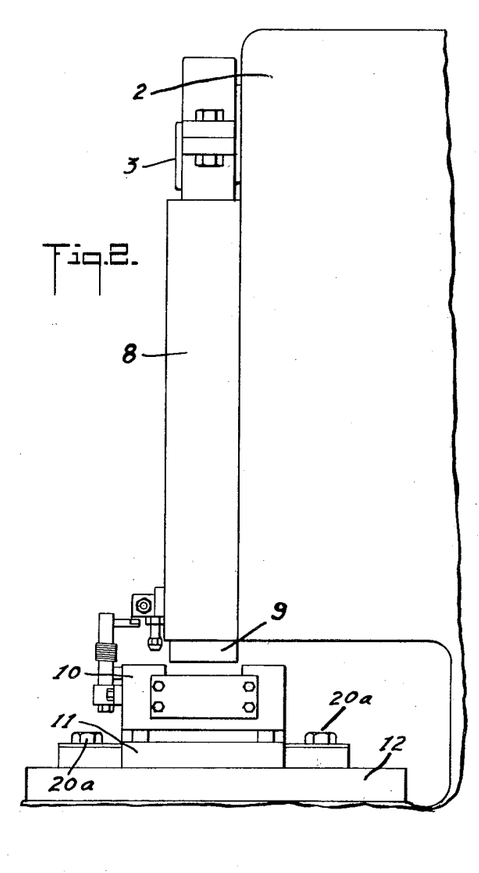
Fig. 2 is a side elevation of the same.

In the accompanying drawings the invention is illustrated (see particularly Figs. 1 and 2) in connection with a power press of known construction comprising a frame 2 in which is journalled a shaft 3 carrying an eccentric 4 connected by means of a strap 5 and rod 6 with a ram 7 slidably mounted in guides 8.

In accordance with the invention three dies 9, 10 and 11 are used, the upper die 9 being mounted on the ram 7 while the intermediate and lower dies 10 and 11 respectively are mounted on the base 12 of the press 1.

Figure 11:
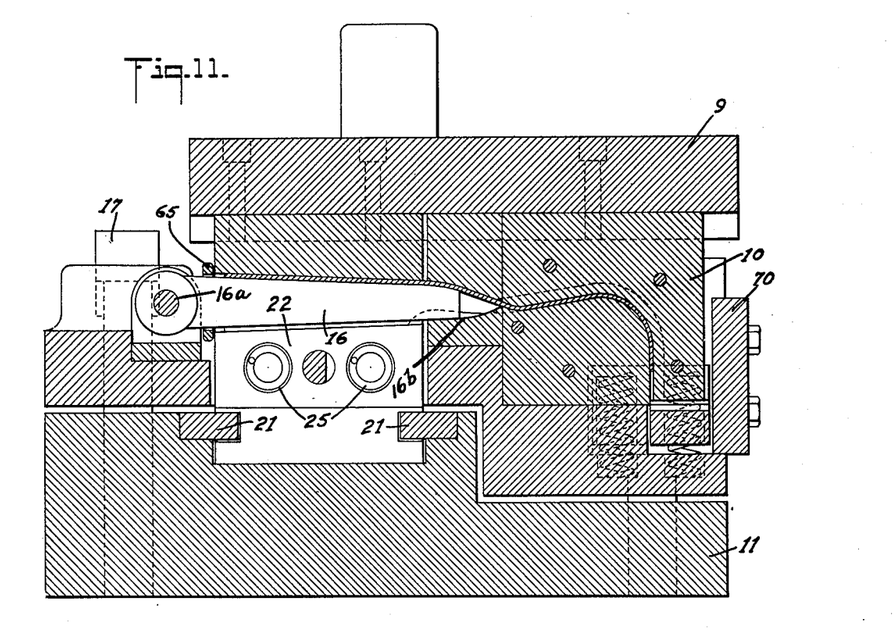
Fig. 11 is a vertical section on line 11—11 of Fig. 7 showing the three dies in closed position and a finished weeder.

Referring now more particularly to Figs. 3 to 15 which illustrate the production of a weeder, the tool portion of which is formed integrally with a tubular portion adapted for use as a handle or a handle socket, the upper die 9 in this instance comprises upper handle formers 12 and upper finger formers 13, the latter being formed separately from the main part of the die and attached thereto by screws 14. The intermediate die 10 comprises lower finger formers 15 and a handle forming mandrel 16 and is slidably mounted on guide posts 17 which project upwardly from the base of the press. The mandrel 16 is preferably tapered to facilitate withdrawal or ejection of the finished article and is also pivotally secured to the die at 16a at its larger end, the smaller end extending into a recess 16b (Figs. 11 and 12) in the die where it is secured against downward movement.

The lower die 11 comprises a base provided with holes or slots 20 by which it can be secured to the base of the press by means of bolts or studs 20a extending upwardly from the latter. The opposite ends of springs 18 are housed in recesses 19 formed in the juxtaposed faces of the intermediate and lower dies 10 and 11.

Slidably supported between guides 21 on the lower die 11 are handle closing jaws 22 having oppositely curved faces 23 and provided with inclined surfaces 24a which coact with similar surfaces 24 on the intermediate die 10. The opposite ends of spring 25 are housed in recesses 26 located in the handle closing jaws 22, and a latch stud 27 secured to one of said jaws by a screw 28 is slidable in a hole 29 in the other jaw 22. Operatively associated with the latch stud 27 is a latch 30 which is slidably supported in an opening 31 by a spring 32 held in position by a plate 33 and a screw 34. Operatively associated with the latch 30 but not in vertical alignment with it is a latch actuating stud 35 which is engaged at its end 36 by an adjustable operating bolt 37 attached to the upper die 9.

A finished tool ejector mechanism, part of which is atached to the upper die 9 and the remainder to the intermediate die 10 comprises an upper bearing 39 which slidably supports an ejector latch 38 provided with a pair of inclined surfaces 41 and a pin 42 slidable in a slot 43 in the wall of the bearing. The ejector latch 38 has a reduced portion 44 surrounded by a spring 45 housed between a shouder 47 formed by the reduction in diameter of a part of the latch 38 and an end 48 of the bore 40 of the bearing 39. A screw threaded end 49 of the latch 38 projects through the end of the bearing 39 and lock nuts 50 are mounted thereon. The parts abovementioned are operatively associated with the upper die 9.

The remainder of the ejector mechanism is operatively associated with the intermediate die 10 and comprises a trip rod 51 secured in and projecting from an opening 52 in an ejector stud 53. A screw 54 in the stud 53 holds one end of a spring 55 surrounding the stud 53 and the other end is held by a pin 56 extending upwardly from a lower bearing 57, this pin also acting as a stop to limit the movement of the ejector arm hereinafter described. The bearing 57 is mounted on the intermediate die 10 and held in position by cap screws 58. A shoulder 59 on the stud 53 rests on the upper face of the bearing 57 through a bore 60 of which extends a reduced portion of the stud 53 which is secured at its lower end 61 by a nut 62.

An ejector arm 63 pivotally attached to the stud 53 by a pin 64 is provided with ejector fingers 65, which partially surround the mandrel 16, and a stop or extension 66 which coacts with a hook-shaped stop 67 extending upwardly from the intermediate die 10 in a manner to be hereinafter described.

A finished tool lifting device comprises, on the intermediate die 10, springs 68 (Fig. 12) enclosed in a recess 69 formed in the body of the die 10 and closed by a plate 70 held by screws 71. A lifting plate 72, supported by the springs 68 is limited in its upward movement by stop screws 73.

Figures 2, 10, 14, 15:
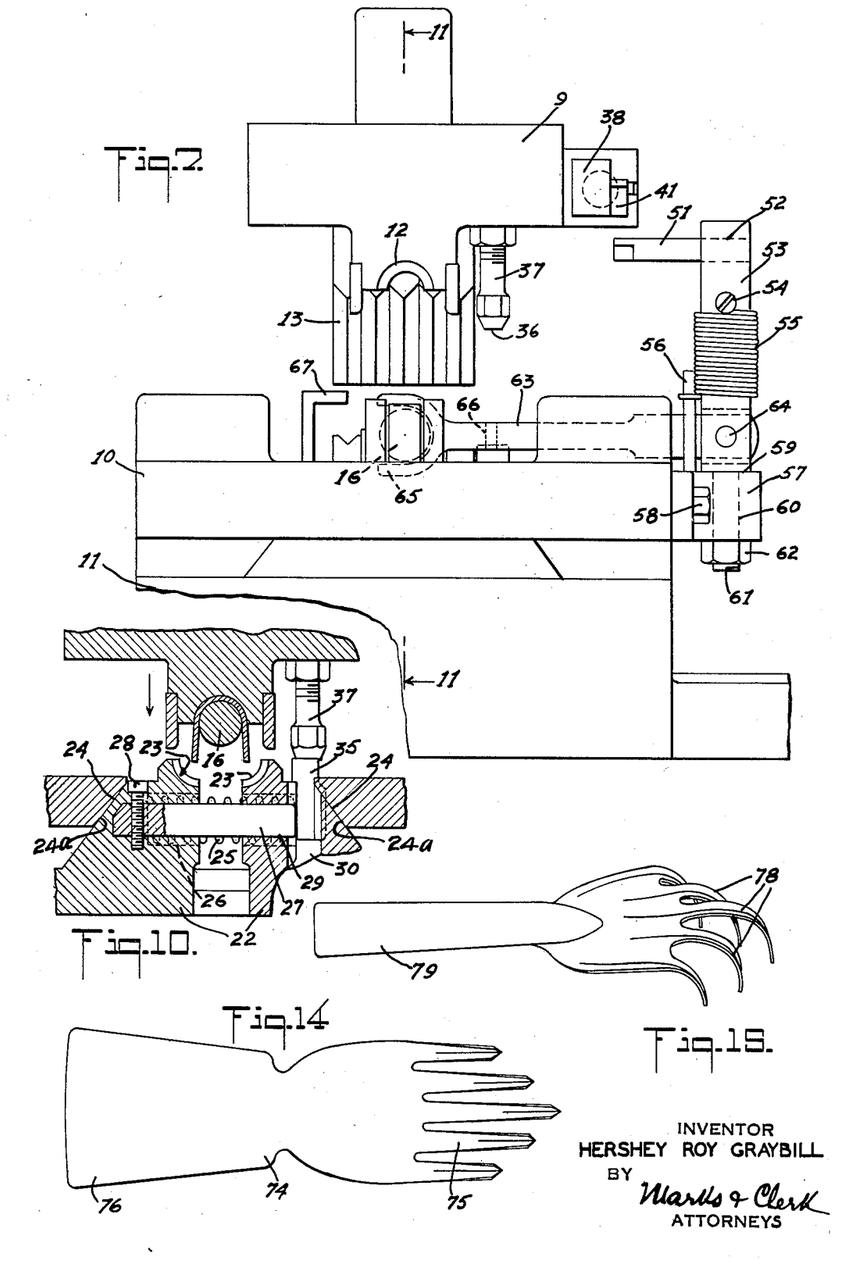
Fig. 10 is a part section similar to Fig. 9 showing the handle end of a blank partly formed.
Fig. 14 is a plan of a weeder blank before forming.
Fig. 15 is a perspective view of a finished weeder.

Fig. 14 illustrates a weeder blank 74 which comprises finger forming portions 75 and a handle forming portion 76, and Fig. 15 illustrates a finished weeder comprising fingers 78 and a handle 79.

Figure 16:
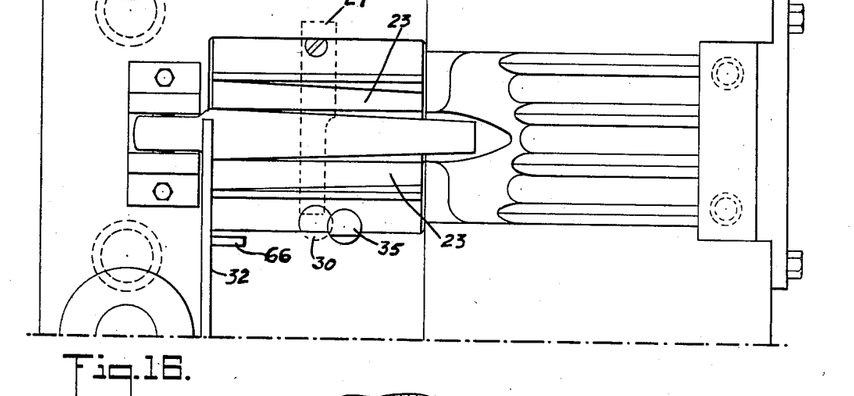
Fig. 16 is a part plan similar to Fig. 5 but showing a fork die.
Figure 17:
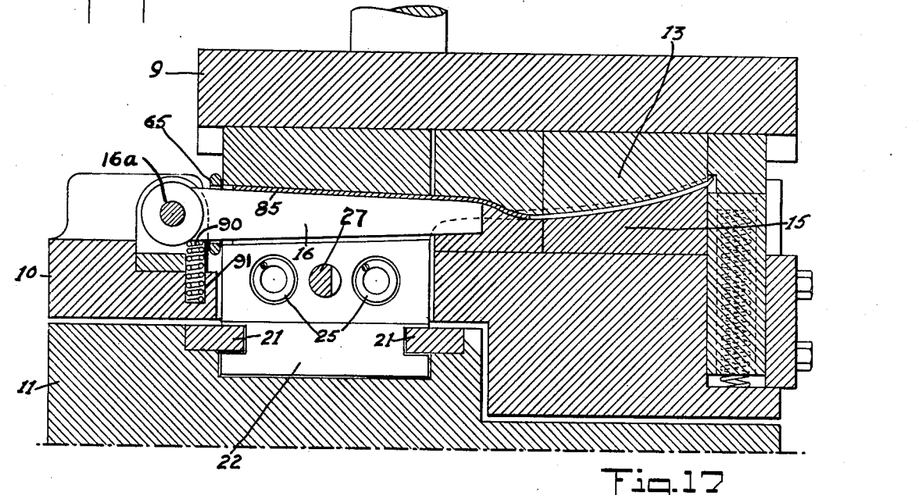
Fig. 17 is a section similar to Fig. 11 but with a finished fork in position.
Figure 18:
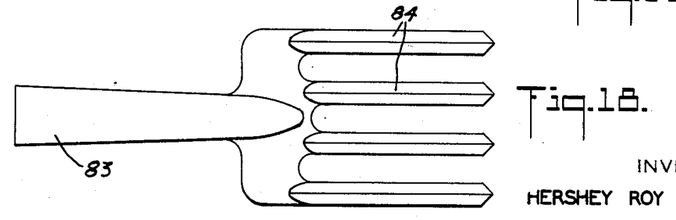
Fig. 18 is a plan of a finished fork.

Figs. 16 and 17 of the drawings illustrate dies suitable for the production of garden forks, such dies differing from those previously described merely in the shape of the finger formers 13 and 15 which are in the present instance adapted to the formation of the prongs of a fork. A finished fork is illustrated by Fig. 18 and comprises a handle 83 and prongs 84.

Figure 19:
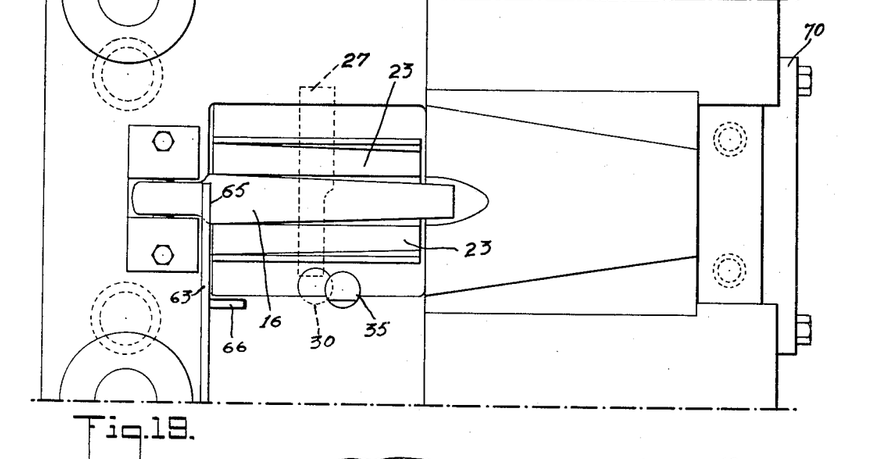
Fig. 19 is a part plan similar to Fig. 5 but showing lower trowel forming dies in place.
Figure 20:
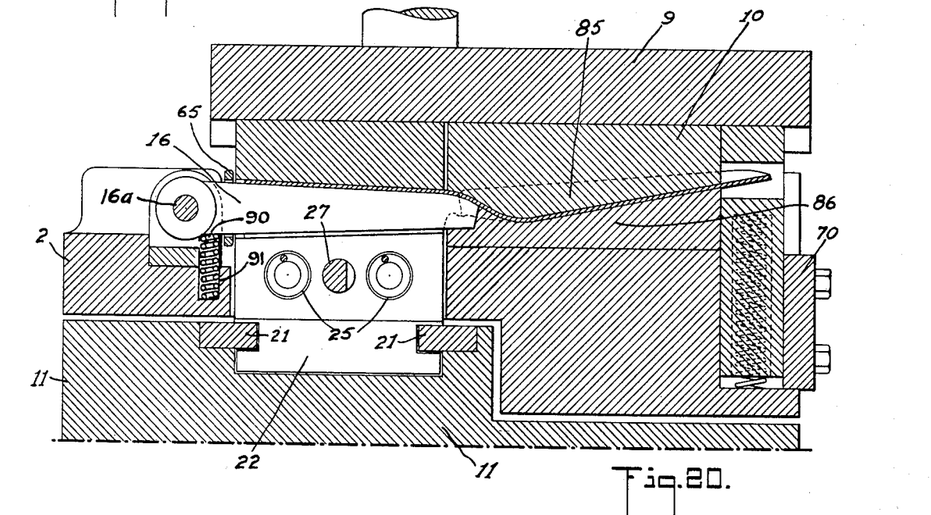
Fig. 20 is a sectional view similar to Fig. 17 but with a finished trowel in place.
Figure 21:
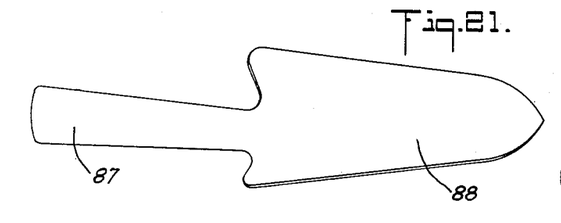
Fig. 21 is a perspective view of a finished trowel.

Figs. 19 and 20 illustrate dies suitable for the production of garden trowels which dies differ from those previously described in that for the finger formers blade formers 85 and 86 are substituted. A finished trowel is illustrated in Fig. 21 and comprises a handle 87 and a blade 88.

Figure 3:
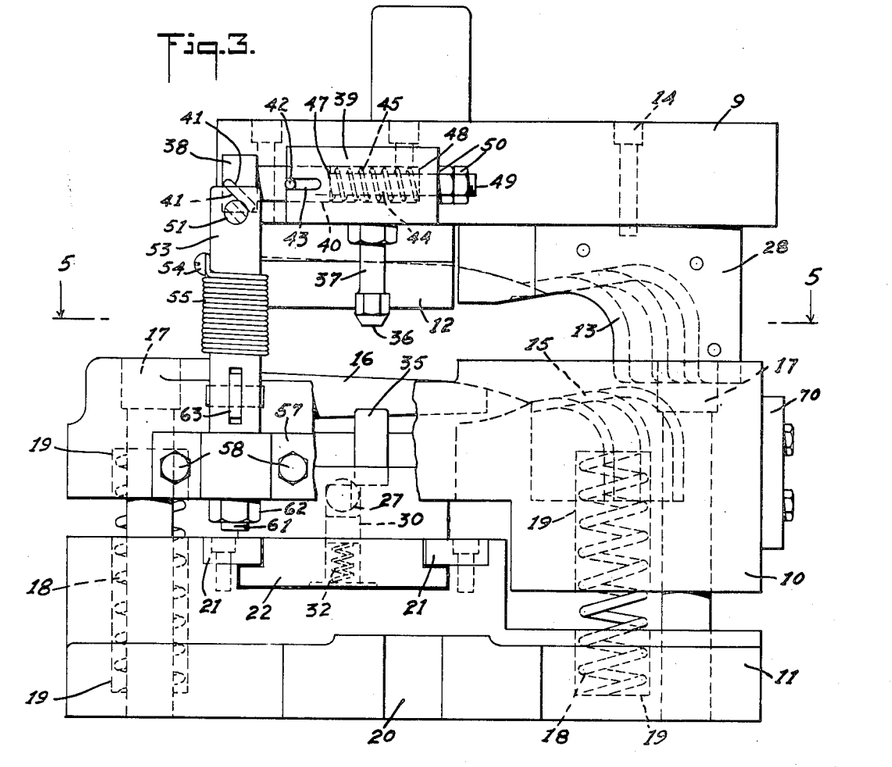
Fig. 3 is a side elevation to a larger scale illustrating in their open position dies suitable for the formation of garden weeders.
Figures 6, 8, 9:
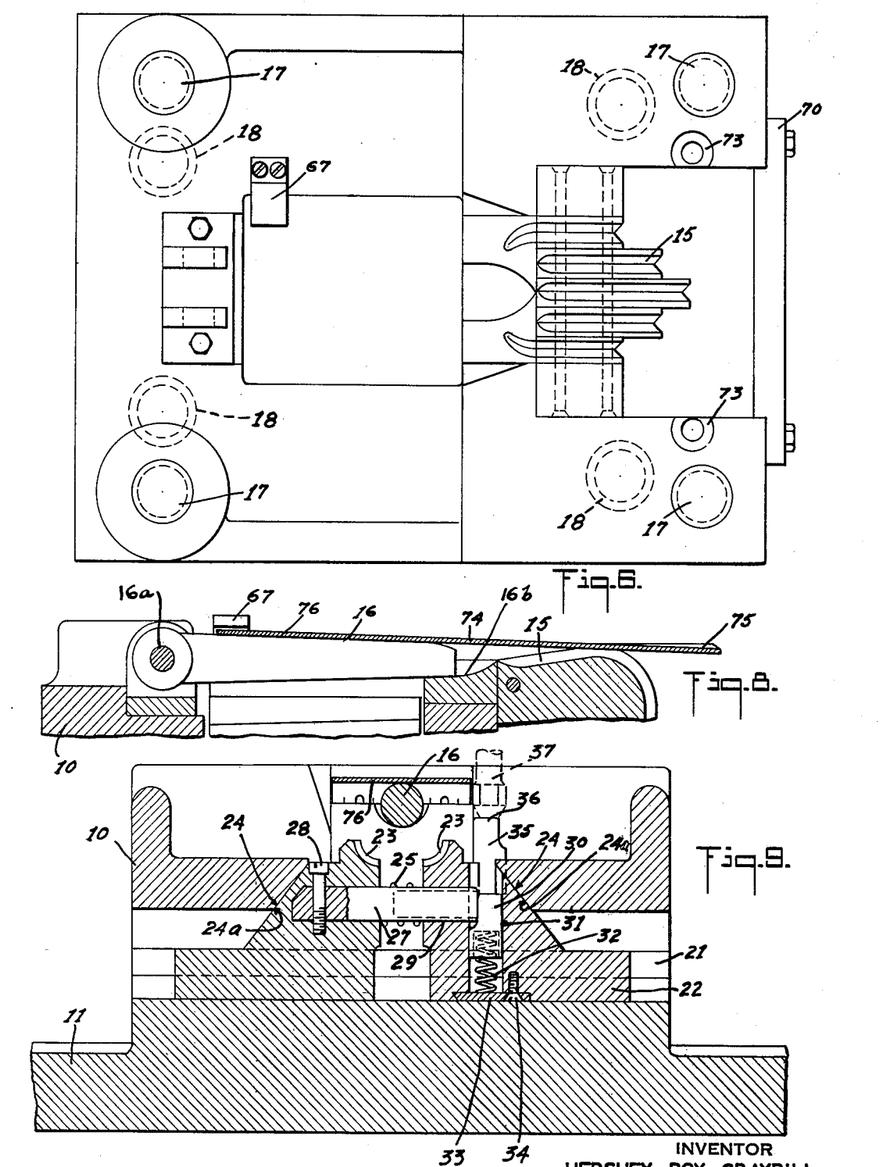
Fig. 6 is a view somewhat similar to Fig. 5 illustrating the intermediate die with the handle formers and ejector removed.
Fig. 8 is a part section showing a weeder blank in place.
Fig. 9 is a part sectional elevation taken on the line 9—9 of Fig. 5 showing the handle end of a blank in position.
Figure 22:
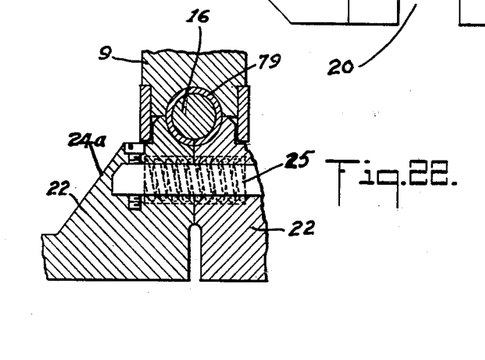
Fig. 22 is a sectional elevation similar to Fig. 10 partly cut away showing the handle closing dies in closed position with a handle in place.

In the manufacture of a weeder as illustrated by Figs. 3–15 a weeder blank 74 is placed on the intermediate die 10 as shown in Fig. 8 of the drawings with the three dies in the position shown in Fig. 3. The sides of the handle portion 76 of the blank rest respectively under the hook-shaped member 67 and against the stop 66. The press ram 7 is then caused to descend in the known manner carrying with it the upper die 9. When the upper die 9 contacts with the tool blank previously placed as indicated above, the forming operation will commence provided the springs 18 which support the intermediate die 10 are stiff enough to withstand the pressure required for forming. However, if the springs 18 are made only sufficiently stiff to support the weight of the intermediate die 10, said die will be forced downward against the upward pressure of the springs 18 until its downward movement is temporarily arrested by the combined action of the latch mechanism 27, 30, 35, 37, the inclined surfaces 24a of the jaws 22 and the inclined surfaces 24 of the intermediate die 10. At this point the jaws 22 being held in the locked open position, as shown in Fig. 9, the inclined surfaces 24 of the intermediate die 10 abut against the firmly held inclined surfaces 24a, thus preventing the movement of the die 10 toward the die 11. The upper die 9 and the intermediate die 10 being free to approach one another, will proceed with the forming operation. As the dies 9 and 10 approach each other the fingers 78 are formed between the formers 13 and 15 and at the same time the handle portion 76 is partially bent around the mandrel 16 as shown in Fig. 10. The operating bolt 37, having been previously adjusted, presses the latch actuating stud 35 downward at this stage in the forming operation, and the stud 35 in turn depresses the latch 30 against the action of the spring 32 until said latch clears the latch stud 27 thereby rendering the jaws 22 free to move together (see Fig. 10). The forming operation performed by the upper die 9 and the intermediate die 10 having been completed, these two dies are separated only by the partially formed tool and continue their downward movement as a unit, the latch 30 having been depressed. The inclined surfaces 24 on the intermediate die 10 pressing upon the inclined surfaces 24a of the jaws 22, cause the jaws to approach one another. Due to the downward movement of the upper die 9 and the intermediate die 10 acting as a unit, as abovedescribed, combined with the closing of the jaws 22, the curved surfaces 23 of said jaws complete the formation of the tool handle, as shown in Fig. 22. As all three dies approach the position shown in Fig. 3 the operating bolt 37 is drawn away from its contact with the latch actuating stud 35, the inclined surfaces 24 are moved upward by the action of the spring 18, thus clearing the surfaces 24a, and the spring 25 presses the jaws 22 apart and allows the latch 30 to be pressed by the spring 32 into its upward or locking position.

It is to be noted that by the combined use of the latch mechanism 27 etc. and the inclined surfaces 24, 24a, the springs 18 need be strong enough only to raise the intermediate die 10 into the open position, whereas if the aforementioned latch were not used the springs 18 would have to be sufficiently stiff to support the die 10 against the preliminary forming operation which takes place between the dies 9 and 10.

The operation of the finished tool ejector is as follows:—At the start of the downward movement of the die 9, the lower inclined surface 41 of the ejector latch 38 engages the ejector lever 51. As the ejector stud 53 is restrained from further counter-clockwise movement by the pin 56 the inclined surface 41 slides over the lever 51, forcing the latch back against the spring 45. Turning movement of the latch is prevented by the pin 42 sliding in the slot 43. As soon as the die 9 has moved downward far enough to permit the latch to clear the lever 51, the spring 45 forces the latch back to its forward position. Upon the upward stroke of the ram when the tool is finished the latch 38 is prevented from further outward movement by the nuts 50 and the upper inclined surface 41 engaging the trip rod 51 causes said trip rod to move in a clockwise direction, thus turning the ejector stud 53 and imparting to the ejector arm 63 a movement which gives the handle of a finished tool a sharp blow toward the small end of the mandrel 16, thus ejecting the tool from the dies.

Figures 12, 13:
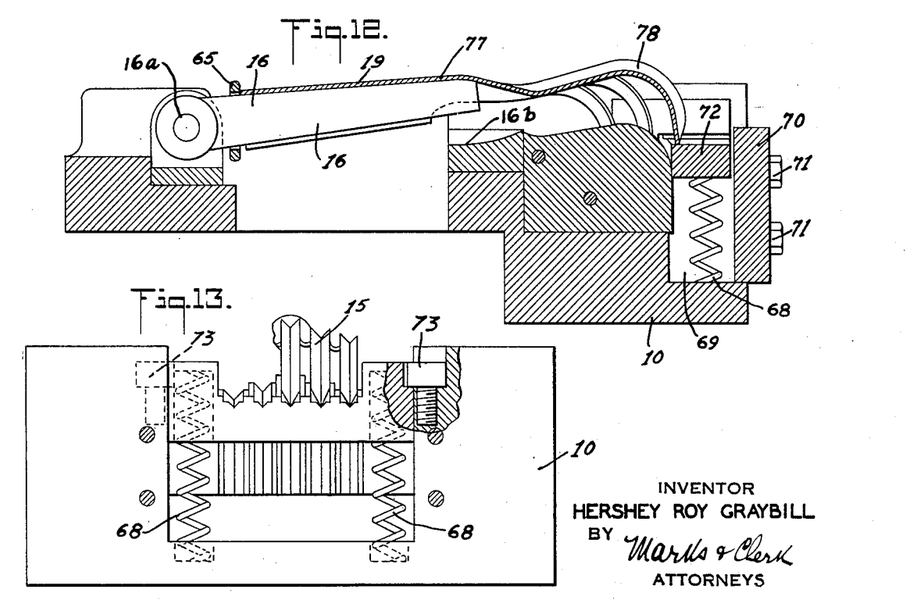
Fig. 12 is a part section taken on the line 12—12 of Fig. 5 showing a finished weeder ready to be ejected.
Fig. 13 is a part sectional elevation viewed from the right hand side of Fig. 5.

When making a weeder the finished tool is lifted up to a position for ejection by means of the device shown in Fig. 12. Upon the upward stroke of the dies and before engagement of the trip rod 51 by upper inclined surfaces 41 of the ejector latch 38, the lifting plate 72 is forced upward by the spring 68 carrying with it the finished tool to a position clear of the dies and in readiness to be thrown out of the machine by the ejector mechanism.

It will be noted that the operating portion of a fork or a trowel is comparatively flat and therefore to lift one of these finished tools clear of the dies for ejection from the machine requires a much shorter vertical movement of the free end than is the case with the dies for forming the weeder Therefore, in the dies for making forks and trowels the lifting device 68—72 may be replaced by a spring 90, as shown in Fig. 17, 20, the lower end of which is held in a recess 91 in the intermediate die 10 under and pressing against the mandrel 16 beyond the inside edge of the pin 16a. Upon the upward movement of the ram 7, as soon as the upper and intermediate dies 9 and 10 begin to separate, the lifting action of the spring 90 becomes effective and causes the mandrel 16, carrying a finished tool, to swing upwardly about its fixed end as a center thereby lifting the operative part of the finished tool clear of the die to a position suitable for ejection.

Figure 4:
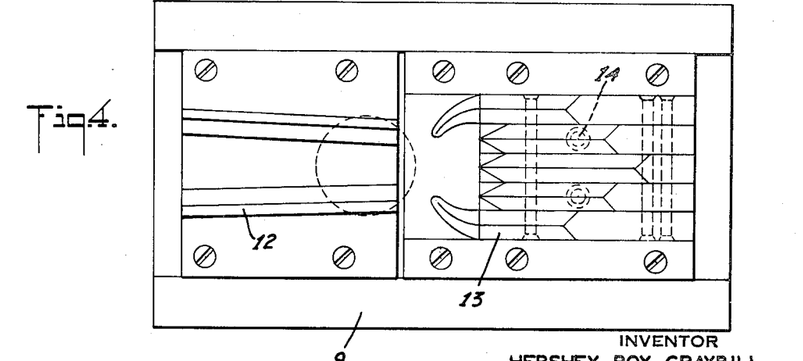
Fig. 4 is an inverted plan of the top die.
Figure 5:
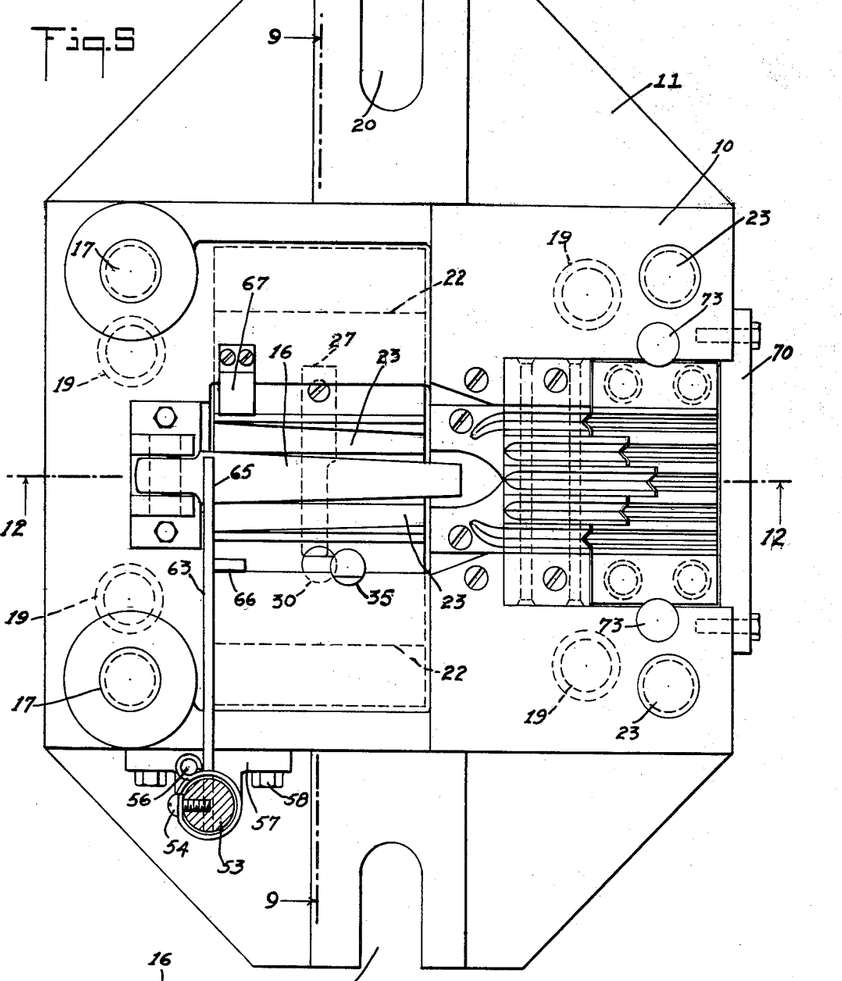
Fig. 5 is a sectional plan on the line 5—5 of Fig. 3 illustrating the intermediate die and also parts of the lower die.

In the dies for forming the weeder as shown in Figs. 3 and 4, the upper finger formers 13 are attached to the main part of the die by screws 14 and the lower finger formers 15 are attached to the main part of the intermediate die 10 in a similar manner not shown in the drawings. The portions of the dies for forming the handles are in each case not removable from the dies. The parts of the dies carrying the shaping surfaces for forming the blades of trowels and the prongs of forks are likewise removably attached to the main parts of the dies. Thus it is evident that in order to change over from the manufacture of one tool to the production of any other, it is necessary to remove only the parts of the upper die 9 and the intermediate die 10 required to form the operative portion of a tool and replace them with other parts as the handles are preferably similarly designed and are the same on all the tools.

In placing a blank in the machine it is necessary to use certain limiting stops against which to place the blank so that the blank will not move out of position during the start of the forming process. For this purpose a hook-shaped stop 67 which holds the blank against lateral motion in one direction and also serves to prevent a tipping or tilting action is placed so that it extends upwardly from the intermediate die 10. A coacting stop or extension 66 positioned on the ejector arm 63 approximately opposite the stop 67 prevents a lateral motion in the opposite direction.

In placing a blank in the dies one side of the handle portion is pressed snugly against the hook-shaped stop 67 with the hook extending over its edge and the other side is placed against the extension 66. The end of the handle blank is placed against the ejector fingers 65. Thus, the machine operator places each blank in the position intended and the possibility of forming a tool improperly is obviated.

The above described dies may be used either in a vertical press or, if preferred, in an inclinable press to facilitate the ejection of a finished tool. It is also obvious that in addition to those described, other sheet metal tools or articles may be formed by varying the shaping surfaces of the dies.

I claim:—

1. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, and a mandrel secured to the intermediate die and forming part of the shaping surfaces thereof.

2. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, and a tapered mandrel pivotally secured at its larger end to the intermediate die and forming part of the shaping surface thereof.

3. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, and jaws slidably mounted on the lower die and coacting with said mandrel to form a tubular portion of the finished article.

4. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, jaws slidably mounted on the lower die and coacting with said mandrel to form a tubular portion of the finished article, inclined surfaces on said jaws, and inclined surfaces on the intermediate die coacting with said first-mentioned inclined surfaces to force said jaws together as the intermediate die approaches the lower die.

5. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surfaces thereof, jaws slidably mounted on the lower die and coacting with said mandrel to form a tubular portion of the finished article, inclined surfaces on said jaws, inclined surfaces on the intermediate die coacting with said first-mentioned inclined surfaces to force said jaws together as the intermediate die approaches the lower die, resilient means for moving said jaws apart, latch means for locking said jaws apart, and means for tripping said locking latch as the intermediate die approaches the lower die.

6. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, a spring housed in a recess in the intermediate die, and a lifting plate supported by said spring and engaging the end of the finished article remote from the pivoted end of the mandrel.

7. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, and a spring housed in a recess in the intermediate die and pressing at one end on the underside of the mandrel.

8. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, jaws slidably mounted on the lower die and coacting with said mandrel to form a tubular portion of the finished article, means for raising the mandrel about its pivoted end on the separation of the upper and intermediate dies, and means for ejecting thereafter the finished article.

9. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, jaws slidably mounted on the lower die and coacting with said mandrel to form a tubular portion of the finished article, means for raising the mandrel about its pivoted end on the separation of the upper and intermediate dies, an ejector stud pivotally secured to the intermediate die, an ejector arm pivotally secured at one end to said ejector stud, ejector fingers on the other end of said ejector arm engaging the pivoted end of the mandrel behind the work piece, and means for partially rotating the ejector stud after separation of the intermediate and upper dies on the upward movement of the ram.

10. A die press for forming sheet metal articles, said press having a ram and a base, an upper die secured to said ram, a lower die secured to said base in operative alignment with said upper die, an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surface thereof, jaws slidably mounted on the lower die and coacting with said mandrel to form a tubular portion of the finished article, means for raising the mandrel about its pivoted end on the separation of the upper and intermediate dies, an ejector stud pivotally secured to the intermediate die, an ejector arm pivotally secured at one end to said ejector stud, ejector fingers on the other end of said ejector arm engaging the pivoted end of the mandrel behind the workpiece, a pin secured to the intermediate die and abutting one side of the ejector lever, a trip rod secured to said ejector stud, an ejector latch slidably mounted on the upper die, a spring associated with said latch, and upper and lower inclined surfaces on the end of said latch engageable with said trip rod.

11. A die set for forming sheet metal garden implements having a tool part integral with a tubular handle comprising an upper die, an intermediate die and a lower die securable in operative alignment, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, a tapered mandrel pivotally secured at its larger end to the intermediate die and forming part of the shaping surfaces thereof, jaws slidably mounted on the lower die and coacting with said mandrel to form a tubular portion of the finished article, means for causing approaching movement of said jaws as the intermediate die approaches the lower die, means for raising the mandrel about its pivoted end as the upper die separates from the intermediate die, ejector means associated with the intermediate die, and ejector-actuating means associated with the upper die.

12. A die set as in claim 11 having in addition latch means associated with the lower die for locking the slidable jaws apart, the inclined surfaces of said locked jaws forming a temporary support for the intermediate die, and means associated with the upper die for releasing said latch upon completion of the forming action between the upper and intermediate dies.

13. A die press for forming sheet metal articles, said press having a ram and a base, an upper die secured to said ram, a lower die secured to said base in operative alignment with said upper die, an intermediate die interposed between said dies, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, means for positively supporting the intermediate die in spaced relation to the lower die and means for releasing said supporting means to permit coaction between the intermediate and the lower die upon completion of a forming action between the upper and the intermediate die.

14. A die press for forming sheet metal articles, said press having a ram and a base, three superimposed dies, comprising an upper die secured to said ram, a lower die secured to said base in operative alignment with said upper die, and an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, means for positively supporting the intermediate die in spaced relation to the lower die, means for releasing said supporting means to permit coaction between the intermediate and the lower die upon completion of a forming action between the upper and the intermediate die, and means for automatically raising a finished article into position for ready removal.

15. A die press for forming sheet metal articles, said press having a ram and a base, three superimposed dies comprising an upper die secured to said ram, a lower die secured to said base in operative alignment with said upper die, and an intermediate die, guide means for maintaining said intermediate die in operative alignment with said upper and lower dies, resilient supports between said intermediate and lower dies, forming surfaces on the lower face of the upper die, forming surfaces on the upper face of the lower die, forming surfaces on the upper and lower faces of the intermediate die coacting respectively with the forming surfaces on the upper and lower dies, means for positively supporting the intermediate die in spaced relation to the lower die, means for releasing said supporting means to permit coaction between the intermediate and the lower die upon completion of a forming action between the upper and the intermediate die, and means for automatically ejecting a finished article from the dies.

16. A die set for use in a press comprising an upper die, an intermediate die and a lower die securable in operative alignment, resilient supports between said intermediate and lower dies, forming surfaces on the lower face of the upper die, forming surfaces on the upper face of the lower die and forming surfaces on the upper and lower faces of the intermediate die coacting successively with the forming surfaces on the upper and lower dies, means for positively supporting the intermediate die in spaced relation to the lower die and means for releasing said supporting means to permit coaction between the intermediate and the lower die upon completion of a forming action between the upper and the intermediate die.

HERSHEY ROY GRAYBILL.